United States Patent [19]

Brunnmair et al.

[11] Patent Number: 4,756,729

[45] Date of Patent: Jul. 12, 1988

[54] APPARATUS FOR SEPARATING DUST FROM GASES

[75] Inventors: Erwin Brunnmair, Leonding; Karl Faltejsek, Linz, both of Austria

[73] Assignee: Voest-Alpine Aktiengesellschaft, Muldenstrasse, Austria

[21] Appl. No.: 867,557

[22] Filed: May 28, 1986

[30] Foreign Application Priority Data

May 28, 1985 [AT] Austria ................................. 1599

[51] Int. Cl.$^4$ ............................................. B01D 45/12
[52] U.S. Cl. ...................................................... 55/391
[58] Field of Search ................. 55/391, 392, 394, 395, 55/396, 338, 345, 458, 416, 459 R, 459 A, 459 B, 457

[56] References Cited

U.S. PATENT DOCUMENTS

| | | | |
|---|---|---|---|
| 630,023 | 8/1899 | Baker | 55/396 |
| 768,190 | 8/1904 | Naylor | 55/391 |
| 1,603,020 | 10/1926 | Boldt et al. | 55/459 R |
| 1,810,965 | 6/1931 | Hopkins | 210/484 |
| 2,171,248 | 8/1939 | Berkel | 55/392 |
| 2,392,872 | 1/1946 | Wolfe | 55/345 |
| 3,353,678 | 11/1967 | Dragon | 210/433.1 |
| 3,802,164 | 4/1974 | Bowen | 55/338 |
| 3,885,933 | 5/1975 | Putney | 55/397 |
| 3,890,236 | 6/1975 | Harrell | 210/433.1 |
| 4,130,622 | 12/1978 | Pawlak | 210/497.01 |
| 4,257,791 | 3/1981 | Wald | 55/382 |

FOREIGN PATENT DOCUMENTS

| | | | |
|---|---|---|---|
| 0052862 | 6/1982 | European Pat. Off. | 210/485 |
| 0057034 | 8/1982 | European Pat. Off. | 210/485 |
| 884900 | 7/1953 | Fed. Rep. of Germany | . |
| 1005043 | 3/1957 | Fed. Rep. of Germany | 55/345 |
| 665429 | 9/1929 | France | 210/456 |

OTHER PUBLICATIONS

"Ultrafiltration Saves Oil, Cleans Waste", *Iron and Steel International*, Dec. 1979, vol. 52, No. 6, p. 391.

*Primary Examiner*—Bernard Nozick
*Attorney, Agent, or Firm*—Cushman, Darby & Cushman

[57] ABSTRACT

In an apparatus for separating dust from gases, the gases are caused to flow in a rotating stream (3) within a substantially tubular and/or conical housing (1). A guiding body (9) extends in axial direction of the housing (1). Gas supply is effected via a supply slot (2) and the discharge opening (10) for pure gas is formed of a gap surrounding the guiding body (9), in particular by a tube (13) surrounding the guiding body (9) with formation of a gap. The dust discharge openings are designed as annular slots (7) located adjacent the inner wall (6) of the housing (1). A dust collecting bunker (5) is connected to the bottom of the housing.

3 Claims, 4 Drawing Sheets

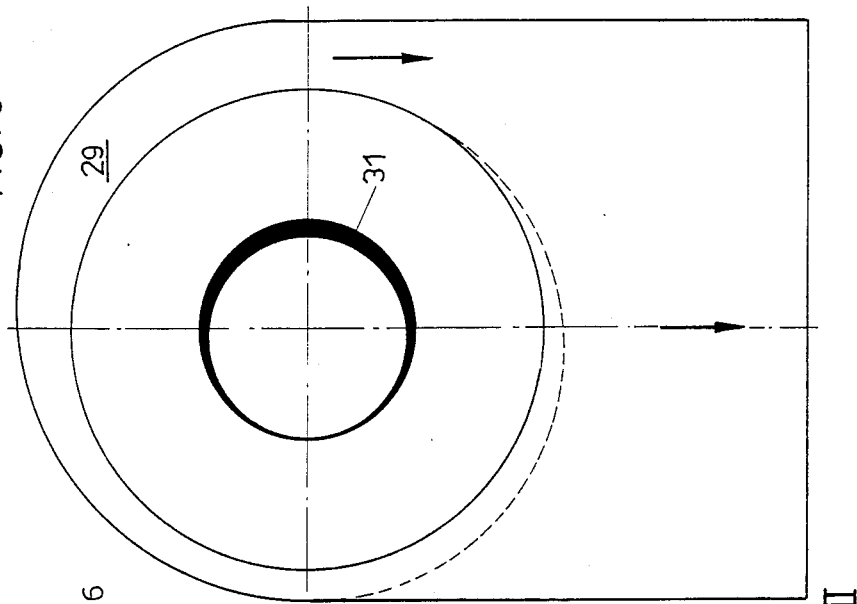
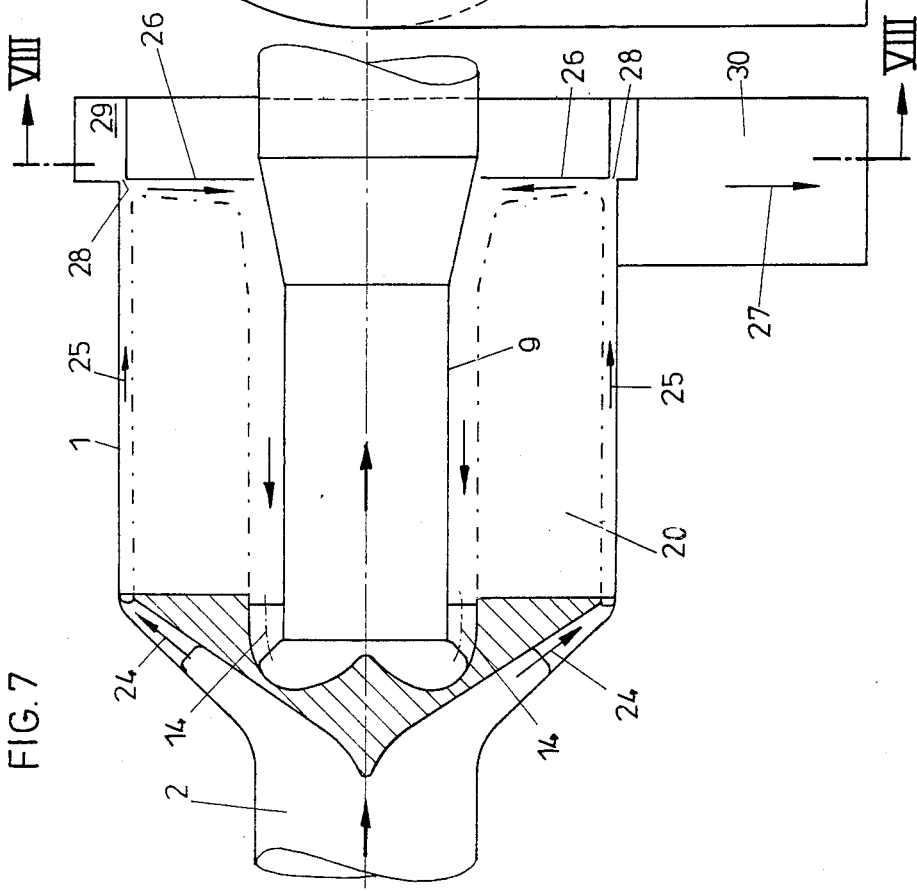

APPARATUS FOR SEPARATING DUST FROM GASES

BACKGROUND OF THE INVENTION

1. Field of the Invention

The invention refers to an apparatus for separating dust from gases in which the gases are caused to effect a rotational movement within a substantially tubular and/or conical housing.

2. Description of the Prior Art

There is known a number of dust separators such as, for example, electrostatic filters and textile filters for separating dust, which not only require substantial maintainance costs but also suffer from the drawback that hot dust removal is not possible without previous heat exchangers. Centrifugal dust removers such as cyclones can easily be operated with hot gases. The dust removal capactiy of centrifugal dust removers is, however, unfavourable in particular with respect to small particle sizes and with known apparatuses the minimum grain size is approximately 20 μm. Cyclones are thus most frequently used as preliminary dust separators. The attempts to reduce the minimum separable grain size in cyclones aim at allowing greater shifting forces to act on the individual particles. For this purpose, greater centrifugal forces would have to be generated by increasing the rotational speed of the flowing stream, which is, however, limited by physical factors such as the tendency to turbulence at higher flow velocities detracting from the separating effect. Furthermore, secondary streams were observed when increasing the rotational speed, which secondary streams result in dust impacting on the cyclone cover, which further impairs the separating effect.

The separating capacity is, however, decisively limited by the separating mechanism made use of up till now for centrifugal force separation. This mechanism is caused by the principle. The vortex-sink-flow becoming effective on account of the shape of the cyclone generates, on the one hand, the desired centrifugal force acting on the dust particles to be shifted and, on the other hand, a drag force according to Stokes at the location of dust removal on account of the flow sink, which drag force is acting in opposite direction to the centrifugal force. This drag force becomes smaller in proportion to the diameter of the, as presupposed spherical, particles and laminar fluid flow around the particles, while the centrifugal force becomes reduced in proportion to the third power of the particle diameter. By this mechanism of forces becoming effective on an individual dust particle, separation of finest particles within the cyclone is prevented. The helical flow within the cone of the cyclone and directed to the dust collecting bunker is favourable at this location because it moves those particles in direction to the bunker opening which have been shifted onto the wall. Just before reaching the bunker opening, the helical flow is reversed in direction to the axis of the cyclone, which results in a local increase of the radially inwardly directed flow velocity within the area of the highest dust concentration within the cyclone. It is a drawback that at this location the rotational speeds are the smallest ones. This again results in a reduction of the separating capacity.

From DE-PS No. 28 32 097 there has already become known a centrifugal force separator in which a stream of a fluid charged with suspended particles is tangentially supplied to a separating chamber and discharge of the fraction of lower weight is effected by means of immersion tubes extending into the housing of the vortex chamber. In this case, only part of the supplied stream of raw gas is sucked off by means of the immersion tubes and the portion having not been sucked off and remaining within the vortex chamber is utilized for forming a stationary vortex.

From US-PS No. 3 885 933 there has become known a two-stage classifying equipment operating according to cyclone separating principle, in which equipment the reversal of the flow direction is effected against a pressure head within a dust discharging cone and in which the discharge means for pure gas is immediately adjacent the dust discharge openings.

SUMMARY OF THE INVENTION

The invention now aims at providing an apparatus of the initially mentioned type in which the minimum separable grain size can be reduced as compared with known centrifugal force separators and with which dust can be removed from gases for the greatest part and with low energy consumption. For solving this task, the invention essentially consists in that a guiding body is provided which extends in axial direction of the housing, in that the discharge opening for the pure gas is formed of a gap surrounding the guiding body and in that a radially inwardly directed baffle plate is arranged between the discharge opening for the dust and the guiding body. In this manner, there results a comparatively simple construction. The dust-loaden gases are in usual manner tangentially supplied, which results in the rotating flow. Like in known cyclones there results a separation effect on account of the centrifugal force and Stokes' drag forces can be observed. The forces are, however, encountered within other areas, noting that articles having been taken along can only come till near the outer wall of the guiding body, where, however, there is generated again a high angular velocity and thus a great centrifugal force. There is generated a secondary stream from the housing via the bottom to the guiding body, noting that this stream moves upwardly in opposite direction along the guiding body within thin layers. The suction opening is designed as a gap surrounding the guiding body, and vortex energy can be recovered within the gap. Above the inwardly directed baffle plate, the laminated stream is a plane vortex-sink-stream with spiral-shaped flow lines. The helical stream is separated from the major part of the dust contained therein on the housing when being transformed into the plane vortex-sink-stream, and this dust can be discharged via a dust-discharge slot. The separation is effected during deflection of flow on account of the greater mass moment of inertia of the dust particles. In direction to the guiding body, the rotational speed becomes again greater and the flow along the guiding body takes again place along helical flow lines till the discharge opening for the pure gas, noting that a finishing separating zone is formed within this area on account of the greater centrifugal force. Within this finishing separating zone, a centrifugal force is acting in radial direction as a shifting force on account of the helical stream, noting that no flow force is counteracting within this zone on account of the effect of the sink. For obtaining a maximum length of this finishing separating zone, the arrangement is such that the gas exit opening is arranged at that front face of the housing which is located opposite the discharge opening for the dust.

In a constructively extremely simple manner, the exit opening for the pure gas can be formed of a tube surrounding the guiding body with formation of a gap. Such a surrounding tube defines between its inner wall and the outer wall of the guiding body that gap which serves the purpose of sucking off the pure gas and allows the installation of means for recovering the vortex energy. Baffle plates can, for example, be arranged for this purpose between guiding body and tube. The bottom edge of the tube surrounding the guiding body is preferably arranged within the container.

A very compact construction results if, as is in correspondence with a preferred further development of the apparatus according to the invention, the guiding body is of hollow or tubular, respectively, design and the tube surrounding the guiding body is provided with vanes deflecting the gas stream in direction to the axis of the guiding body.

The gas discharge openings are provided at the bottom of the sink and advantageously provided in the front wall of the housing forming the bottom and in particular designed as a gap located adjacent the inner wall of the housing. Within this area, the tangential stream of the dust-loaden gas is deflected into a plane vortex-sink-flow having spiral-shaped flow lines, noting that during transition into this plane vortex-sink-flow, the major part of the dust contained within the gas is discharged via the dust discharge slot.

In this case it is of advantage if the front wall provided with the dust discharge openings has a surface being upwardly inclined in direction to the guiding body, noting that the dust discharge opening is provided within the lowermost area of this upwardly inclined surface, preferably radially adjacent this surface.

On account of the fact that the rotational speed is increasing during deflection into the plane vortex-sink-flow, there results a pressure difference between the discharge opening for the separated dust located at a greater radius and the outer wall of the guiding body, which pressure difference can be utilized for improving the discharge of dust if the front surface comprising the dust discharge openings, in particular the surface upwardly inclined in direction to the guiding body, has perforations, in particular relief bores, in proximity of the guiding body. In this manner, a volumetric gas stream favourizing dust discharge is achieved, noting that substantially pure gas is sucked from the dust collecting bunker connected to the dust discharge opening. This feature additionally prevents a superatmospheric pressure within the dust bag and reliably makes sure a uniform separation of finest dust and the discharge thereof.

BRIEF DESCRIPTION OF THE DRAWING

In the following, the invention is further explained with reference to embodiments shown in the drawing. In the drawing FIG. 7 shows a further embodiment in an axial section and FIG. 8 shows a section along line VIII—VIII of FIG. 7.

DETAILED DESCRIPTION OF THE PREFERRED EMBODIMENTS

Figure 1:
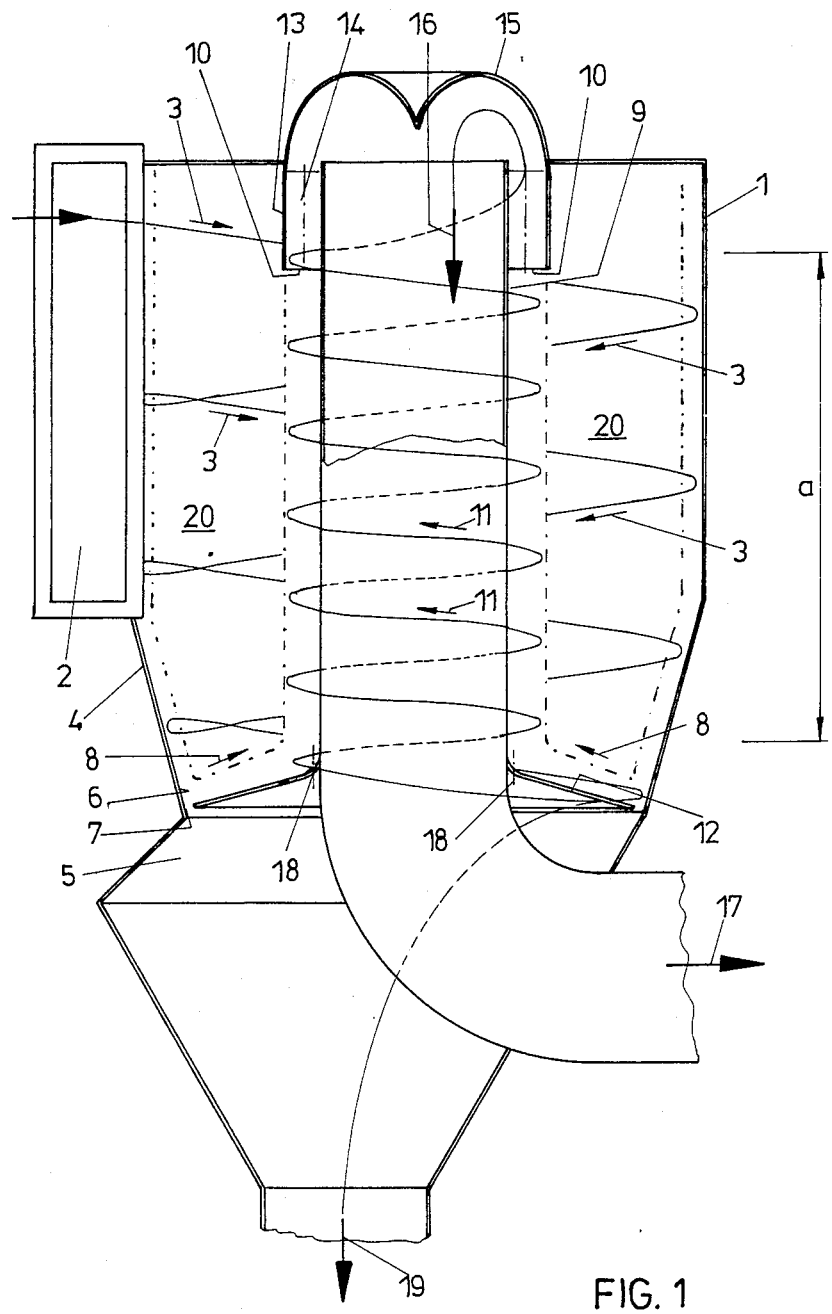
FIG. 1 shows an axial section through an apparatus according to the invention.

The embodiment according to FIG. 1 shows an apparatus for separating dust from gases and comprising a housing 1. Gas is supplied via a supply slot 2 into the housing 1 in substantially tangential direction, the direction of flow of the dust-loaden gases being indicated by the arrows 3. The dust-loaden gas flows via a first cylindrical portion into a conically tapering portion 4 of the housing, noting that the rotational speed becomes increased within this portion 4.

A dust collecting bunker 5 is connected to the bottom of the housing 1. The dust discharge openings are designed as annular slots 7 adjacent the inner wall 6 of the housing 1 and are located at that location at which the gases are deflected in direction of the arrows 8. Within this area of deflection of flow, where the flow, first taking place in circumferential direction, is deflected into a plane vortex-sink-flow, the dust particles enter on account of the greater inertia forces of mass the dust collecting bunker via the dust discharge slots 7, whereas the gas substantially cleaned of dust is deflected in direction of the arrows 8 in direction to a cylindrical guiding body 9 and is subsequently upwardly moving along this guiding body 9 in direction to the exit openings 10 for pure gas. The guiding body 9 is designed as a substantially cylindrical tube and the flow along this guiding body 9 takes place along narrower helical lines in correspondence with the arrows 11.

Deflector means 12 are provided at the bottom of the housing 1 for deflecting the stream. On account of the greater angular velocity resulting after deflection in proximity of the guiding body 9, greater shifting forces are now acting on the dragged particles remaining within the gas stream, said shifting forces moving said particles in direction to the inner wall 6 of the housing 1. The height of this zone of greater angular velocity is designated by a and corresponds to the height of a finishing separating zone within which additional separation of fine dust particles takes place.

The discharge of pure gas takes place via an annular slot surrounding the tubular guide body 9. This annular slot is delimited by a tube 13 surrounding the guiding body 9, and means 14 for recovering the vortex energy can be arranged between the inner wall of this tube 13 and the outer wall of the tubular guiding body. The pure gas discharged via the exit openings 10 are deflected by vane portions 15 in direction of the arrow 16 and enter the interior of the hollow guiding body 9 and can be discharged in direction of the arrows 17.

For reliably preventing during operation the generation of superatmospheric pressure within the dust discharge bunker 5, relief bores 18 are provided within the baffle plates 12 in proximity of the tubular guiding body 9. On account of differing pressure losses within the gas streams above and below, respectively, the baffle plates 12, pure gas is sucked back from the dust discharge bunker 5 via these relief bores 18, so that discharge of dust via the dust discharge slots 7 is favourized and simultaneously the generation of superatmospheric pressure within the dust discharge bunker is reliably prevented. Subsequently, the dust can, as is schematically indicated by the arrow 19, be discharged at the bottom end of the dust discharge bunker 5.

Figure 2:
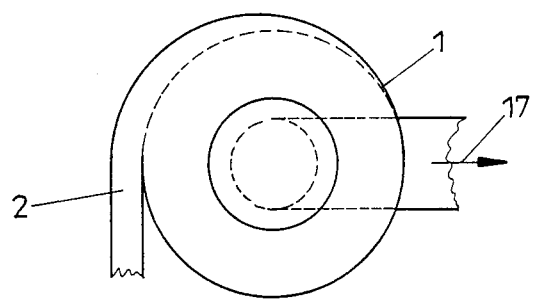
FIG. 2 shows a top plan view of the apparatus according the FIG. 1.

The apparatus according to FIG. 1 is shown in FIG. 2 in a top plan view. In connection with the performance of the apparatus according to FIGS. 1 and 2 it is to be noted that an area 20, which can be designated as a stationary vortex, is formed between, on the one hand, the finishing separating zone immediately adjacent the tubular guiding body 9 and, on the other hand, the volumetric gas stream along the inner wall of the housing 1. Within this stationary vortex, the distribution of rotational speeds is dependent on the radius. The gas supplied via the entry opening 2 for crude gas first flows helically till a location in proximity of the dust discharge slot and is cleaned there from the major part of the dragged dust on account of the deflection there taking place. After this deflection, the flow is continued as a plane vortex-sink-flow having spiral-shaped flow lines along the baffle plate 12 in direction to the guiding body 9, whereupon the flow is again deflected and forms an upwardly directed helical flow. The centrifugal force exerted on still dragged particles within the area of the finishing separating zone on account of the higher rotational speed after further deflection in a direction parallely extending relative to the axis of the guiding body 9 results in shifting the particles into the stationary vortex 20. All particles entering this vortex are further shifted only in radial direction until they enter the helical stream at the inner wall of the housing 1. Within this stationary vortex 20, no axial component of flow is encountered, which enables a precise separation even of light-weighted particles.

Figure 3:
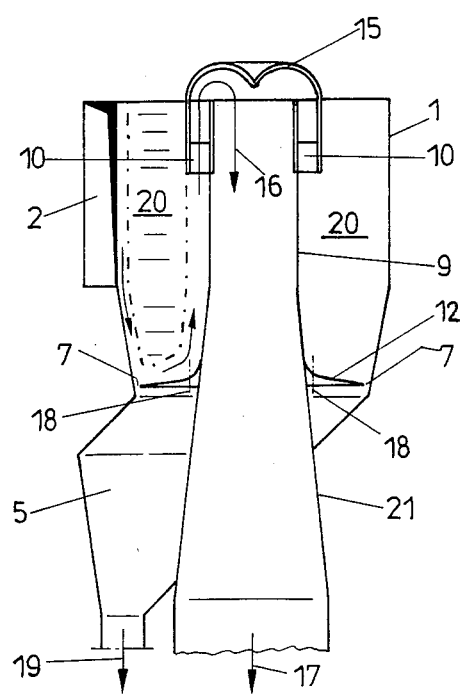
FIG. 3 shows a modified apparatus in a section analogous to that of FIG. 1.
Figure 4:
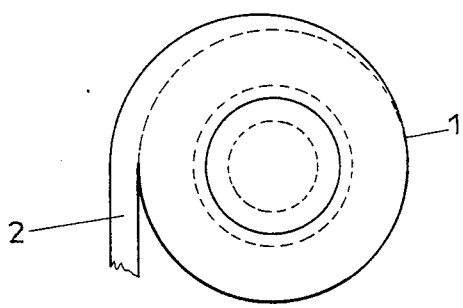
FIG. 4 shows a top plan view of the embodiment according to FIG. 3.

The embodiment according to the FIGS. 3 and 4 differs from the embodiment according to FIGS. 1 and 2 only by the modified design of the discharge means for pure gas. The tubular guiding body 9 has in addition to a substantially cylindrical upper portion, which is located adjacent the suction slots 10, a conically diverging portion 21 which, on the one hand, favourizes the impact-free deflection of the upwardly directed helical flow and, on the other hand, acts as a diffusor within the discharge conduit for pure gas. There are again arranged baffle plates for recovering the vortex energy between the outer wall of the tubular guiding body 9 and the tube surrounding the guiding body 9 and delimiting the discharge slot 10 for pure gas and extending with its bottom edge into the interior of the housing 1 as is the case in the embodiment according to FIGS. 1 and 2.

Figure 5:
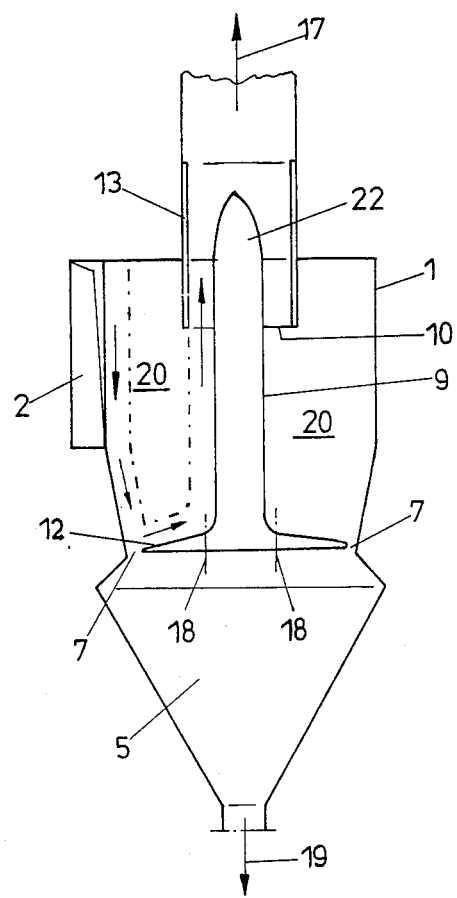
FIG. 5 shows a further modified embodiment of an apparatus in an axial section corresponding to that of FIG. 1.
Figure 6:
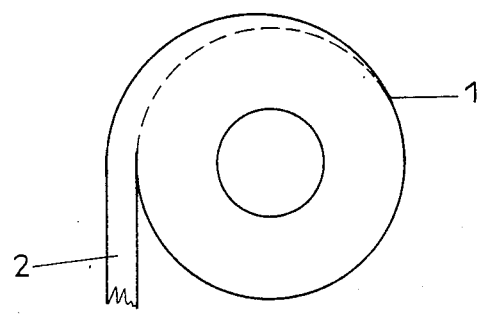
FIG. 6 shows a top plan view of an appratus according to FIG. 5.

In the embodiment according to FIGS. 5 and 6, the tubular guiding body 9 passes over into a diffuser cone 22 within the tube 13 surrounding this guiding body 9. Pure gas is again sucked off via the annular gap 10 defined between the tube 13 and the guiding body 9 and having arranged therein means for recovering the vortex energy. In connection with the other respects, the embodiment according to FIGS. 5 and 6 corresponds in its performance to the previously described embodiments. For better clarity, only the axial component of the flow has been indicated by arrows in the representation according to FIG. 5, noting that the flow downwardly directed in axial direction and adjacent the inner wall of the housing 1 is, of course, a helical flow which is deflected into a plane spiral flow at the area of the baffle plates 12 and that the upwardly directed flow along the tubular guiding body 9 is a helical flow with correspondingly increased angular velocity.

In the embodiment according to FIGS. 7 and 8, the housing 1 is immediately coaxially connected to the gas supply conduit 2. There are provided twist members 24, which generate a rotating upward flow in direction of the arrows 25. The flow is again deflected at a front surface 26 and arrives at the tubular guiding body 9. The exit openings 10 for pure gas and surrounding the guiding body 9 are again provided with means 14 for recovering the vortex energy. The pure gas is passed through the hollow guiding body 9 and is discharged in direction of the arrow 27 in tangential relation to the guiding body 9.

Within the interior of the housing 1 there are again provided guiding means 28 which extend in substantially radial direction.

The dust is discharged via an annular slot 28, and also in this case there is provided the possibility to effect discharge in tangential direction through the collecting chamber 29 as is more clearly shown in FIG. 8. In FIG. 8, the tangential connection of the discharge conduit 30 for pure gas is designated by 31.

What is claimed is:

1. Apparatus for separating dust from dust-laden gases comprising: a substantially tubular housing having a side wall; a tangential inlet to said housing for introducing dust-laden gases such that the gases are given a rotational downward movement within the housing; a generally cylindrical guide body disposed axially within the housing; generally radially disposed deflecting means within the housing for deflecting gases rotationally upward and forming with said side wall an annular dust discharge gap; and a tube having an open end surrounding the guide body and forming therewith an annular dust-free gas outlet gap through which dust-free gas leaves the housing, said cylindrical guide being tubular and having an open end within said tube, and said tube including vanes downstream of said gap with respect to the direction of flow of gas through said gap, said vanes deflecting the gas into the open end of said guide body.

2. Apparatus for separating dust from dust-laden gas comprising: a vertically disposed housing having a sidewall forming a cylindrical upper housing portion and forming a downwardly and inwardly tapered conical lower housing portion; a tangential inlet to the upper housing portion for introducing dust-laden gas; a generally cylindrical guide body disposed axially within the housing and extending the length of the housing; a vertical tube having an open end surrounding the guide body at a location in the upper housing portion and forming with the guide body an annular gap through which dust-free gas passes from the housing; a generally radial deflecting means surrounding the guide body at the lower end of the conical housing portion, said deflecting means forming with said housing side wall an annular gap for discharging dust, the arrangement of the inlet, side wall, guide body and deflecting means being such that dust-laden gas entering the housing are given a downwardly spiral movement along the side wall with the result that dust separates from the gas and passes through the dust discharge gap and such that dust-free gas is deflected radially inwardly by the deflecting means and moves upwardly along the outside of the guiding body to the dust-free discharge gap; means for conducting the dust-free gas from said gap to a location outside the housing; a whirl-free dust bunker connected to the lower end of the conical housing portion for receiving dust from the dust discharge gap; and pressure relief bores extending through the deflecting means at locations near the guide member for preventing the occurrence of superatmospheric pressure within the dust bunker during operation of the apparatus.

3. Apparatus for separating dust from dust-laden gases comprising: a substantially tubular vertical housing having a side wall, a cylindrical upper portion and a lower conical portion tapering inwardly and downwardly; a tangential inlet to said housing for introducing dust-laden gases such that the gases are given a rotational downward movement within the housing; a generally cylindrical guide body disposed axially within the housing and extending the whole length thereof; generally radially disposed deflecting means within the housing for deflecting gases rotationally upward and forming with said side wall an annular dust discharge gap, said deflecting means being located at the lower end of said conical housing portion and being annular in shape and surrounding said guide body and said deflecting means having pressure relief openings therethrough at locations close to said guide body; a tube having an open end surrounding the guide body and forming therewith an annular dust-free gas outlet gap through which dust-free gas passes from the housing; and means for conducting the dust-free gas from said gap to a location outside the housing.

* * * * *